United States Patent
McPherson

(10) Patent No.: US 7,341,285 B2
(45) Date of Patent: Mar. 11, 2008

(54) CHEMICAL FUSION OF NON-METALLIC PIPE JOINTS

(75) Inventor: Terry R. McPherson, Charlotte, NC (US)

(73) Assignee: IPS Corporation Weld-On Division, Compton, CA (US)

(*) Notice: Subject to any disclaimer, the term of this patent is extended or adjusted under 35 U.S.C. 154(b) by 253 days.

(21) Appl. No.: 11/089,222

(22) Filed: Mar. 24, 2005

(65) Prior Publication Data

US 2005/0212297 A1 Sep. 29, 2005

Related U.S. Application Data

(60) Provisional application No. 60/555,923, filed on Mar. 24, 2004.

(51) Int. Cl.
*F16L 13/00* (2006.01)

(52) U.S. Cl. .................. 285/286.1; 285/399; 285/403; 285/23

(58) Field of Classification Search ............... 285/399, 285/285.1, 286.1, 290.1, 290.2, 290.3, 293.1, 285/295.1, 403, 23
See application file for complete search history.

(56) References Cited

U.S. PATENT DOCUMENTS

| | | | | |
|---|---|---|---|---|
| 269,334 A * | 12/1882 | Smith | .................. | 277/627 |
| 317,557 A * | 5/1885 | Marsden | ................ | 285/285.1 |
| 339,036 A * | 3/1886 | Wilbur | ................ | 285/294.3 |
| 615,976 A * | 12/1898 | Felsche | ................ | 285/294.3 |
| 868,349 A * | 10/1907 | Lomax | ................ | 264/40.1 |
| 950,578 A * | 3/1910 | Schmidt | ................ | 138/173 |
| 978,346 A * | 12/1910 | Yarrow | ................ | 285/294.4 |
| 1,158,415 A * | 10/1915 | Boyle | ................ | 285/290.3 |
| 1,462,077 A * | 7/1923 | Weston | ................ | 425/108 |
| 3,606,401 A * | 9/1971 | Schwarz | ................ | 285/294.4 |
| 4,226,444 A * | 10/1980 | Bunyan | ................ | 285/21.1 |
| 4,523,779 A * | 6/1985 | Knox | ................ | 285/294.3 |
| 4,647,080 A * | 3/1987 | Sandt et al. | ............. | 285/296.1 |
| 4,670,207 A | 6/1987 | Yamada et al. | | |
| 4,688,829 A | 8/1987 | Shioda et al. | | |
| 5,449,207 A | 9/1995 | Hockett | | |

(Continued)

FOREIGN PATENT DOCUMENTS

WO    WO98/32207    7/1998

OTHER PUBLICATIONS

U.S. Appl. No. 10/564,590.

*Primary Examiner*—David Bochna
(74) *Attorney, Agent, or Firm*—F. Rhett Brockington

(57) ABSTRACT

A pipe joint for joining pipes having a low surface energy and resistance to solvents. The components are an extrudable adhesive; a first pipe having a socket with an inside diameter, where the socket has a mouth, a self-centering bottom, and a cylindrical wall with an inlet, an outlet, and an inner annular channel; a second pipe having an insertion section with an end and an outer annular channel, where the second pipe has an outside diameter that is less than the inside diameter of the socket, the difference in diameters defining a gap and an interlocking keyway; and a flanged annular ring. The annular ring has an inside diameter that enables it to be slid over the second pipe and a thickness that is comparable to the gap. When the adhesive cures it forms a mechanical key. The adhesive is preferably an alkyl borane adhesive.

16 Claims, 6 Drawing Sheets

U.S. PATENT DOCUMENTS

| | | | |
|---|---|---|---|
| 5,486,024 A * | 1/1996 | Dierdorf | 285/294.3 |
| 5,795,657 A | 8/1998 | Pocius et al. | |
| 5,887,909 A * | 3/1999 | Tokuda | 285/148.9 |
| 6,383,655 B1 | 5/2002 | Moren | |
| 6,436,224 B1 | 8/2002 | Nishimura et al. | |
| 2003/0044553 A1 | 3/2003 | Ramanathan et al. | |
| 2003/0047268 A1 | 3/2003 | Korchnak et al. | |

* cited by examiner

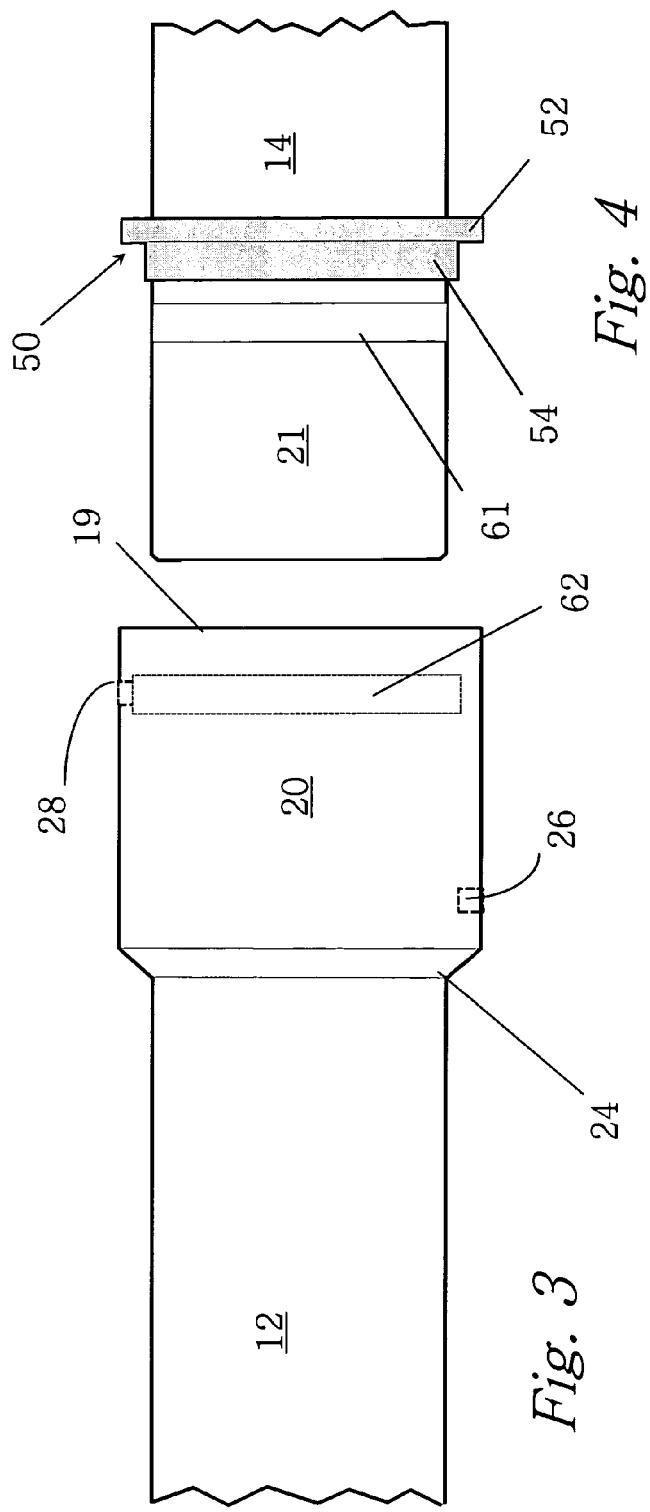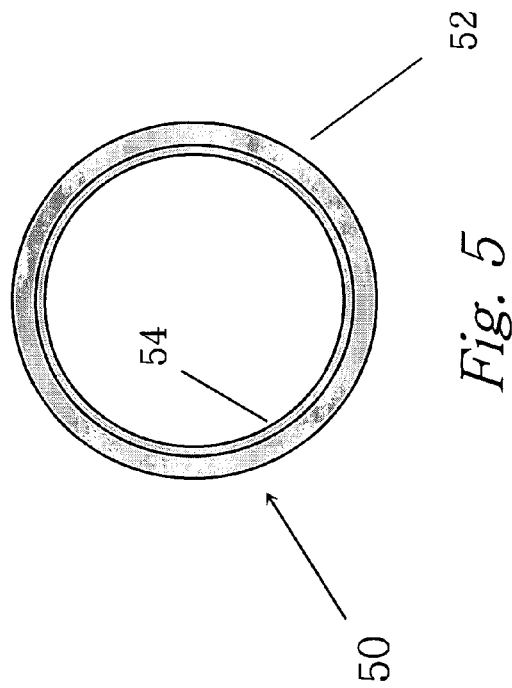

CHEMICAL FUSION OF NON-METALLIC PIPE JOINTS

CROSS REFERENCE TO RELATED PATENT APPLICATION

The application claims the benefit of the priority filing date of the provisional patent application, Ser. No. 60/555,923, filed on Mar. 24, 2004.

BACKGROUND OF THE INVENTION

1. Field of the Invention

The invention relates generally to a method for joining pipes, and more particularly to a method and a system for joining pipes comprised of low surface energy materials, such as HDPE (high density polyethylene), PEX (cross linked polyethylene), and PVDF (polyvinylidene difluoride). Low energy surface materials are generally to be referred to as olefinic materials within the scope of the disclosure and claims of this application.

2. Prior Art

A process called chemical fusion (employing an adhesive) is used to join olefinic plastic pipes comprised of low surface energy materials, such as HDPE (high density polyethylene), PEX (cross linked polyethylene), and PVDF (polyvinylidene difluoride). Olefinic plastic pipes such as those previously mentioned cannot be joined using the same technology to join, for instance, PVC, ABS and CPVC pipes. Pipes made of PVC or ABS or CPVC are typically joined using a solvent cement, where a solvent cement is a solution, emulsion or dispersion of the respective polymer in a volatile etching solvent. An example of a volatile etching solvent is a blend of THF, toluene, MEK. The solvent etches the surface of the pipe, and then dries leaving a coating of the cement and a partial fusion of the surfaces of the joined pipes. When olefinic pipes, such as those previously described, are attempted to be adhered in a similar fashion, the joint bond is unsatisfactory. The low surface energy olefinic plastics are resistant to solvent etching, and the residual adhesive cement does not satisfactorily adhere the two surfaces. Olefinic pipes are typically joined using mechanical means, such as threaded ferrule couplers, Victaulic couplings (e.g. clamps), or joined using heat fusion. With heat fusion, a current is induced in a wire coated with an appropriate olefinic material. The coated wire is wrapped around the pipe, between the inserting pipe section and the socket joint. The wire is inductively heated, which causes the olefinic coating to melt and fuse with the olefinic pipe.

A review of various alkyl borane adhesive systems as they relate to forming pipe joints follows.

U.S. Pat. No. 5,795,657 discloses a two part acrylic adhesive using an organo borane polyamine complex. Various organo borane polyamines, admixed with an oligomeric blend of acrylics, are tested against polyethylene, polyproplene, and Teflon.

In 3M's U.S. Pat. No. 6,383,655, they further address adhesives suitable for low energy surfaces, where the adhesives cure at room temperature. A low energy surface is defined as having a surface energy less than 45 $mJ/m^2$, more typically less than 40-45 $mJ/m^2$, or less than 35-40 $mJ/m^2$. Cited as examples are polyethylene, polypropylene, acrylonitrile-butadiene-styrene, polyamide and fluorinated polymers such as polytetrafluoroethylene (Teflon™). Using the system described in U.S. Pat. No. 6,383,655, the adhesive is cured at room temperature. The substrates tested were polypropylene, polytetrafluoroethylene and high-density polyethylene. Over lap shears for the high-density polyethylene were up to 700 psi and 800 psi for the polypropylene. Over lap shear for fluorinated polyethylene was reported anywhere from 160 to 350 psi. The amines used in U.S. Pat. No. 6,383,655 were substantially shorter than the amines used in U.S. Pat. No. 5,795,657, suggesting that greater cross-linking probably occurred, and that the cohesive force of the adhesive is higher. Anticipated applications mentioned include adhesives, bonding materials, sealants, coatings, and injection molding resins. The disclosed adhesive systems may also be used as matrix resins in conjunction with glass, carbon, and metal fiber mats, such as those used in resin transfer molding operations. They also may be used in encapsulants, potting compounds, electrical components, printed circuit boards, and the like. There was no mention of the use of the adhesive for adhering pipe joints. Of interest is that when using the described adhesive system, they (3M) found it useful to add a thickener such as polybutyl methacrylate (col 11, line 56). This is in contrast to a potential issue for the instant invention, in that a low viscosity adhesive is desired.

U.S. Pat. No. 4,670,207 addresses a number of issues associated with joining olefinic pipe using a socket joint bonding method. According to the reported prior art, wherein the walls of socket and pipe are substantially straight, the insertion of the pipe into the socket produces a bead of adhesive that is expressed outward, and also produces a bead of adhesive that is forced inward. The inward bead can actually partially occlude the pipe, but more importantly is a potential source for contamination. A purported solution to the problem is using a socket and pipe insert where both have tapered walls. Reputedly, the tapering prevents expressing a bead of adhesive when the pipe is inserted into the socket. Reportedly, tapering the inner circumferential surface of the socket portion of the joint and the outer circumferential surface of the end portion of the pipe results in higher bonding pressure, and consequently a high bond strength can be obtained. While the tapering may help in aligning the pipes, in fact, it still would not solve the problem of keeping the end of the inserted pipe coaxial (concentric) with the socket joint, which is a feature of the invented unique pipe joint.

U.S. Pat. No. 5,449,207 is included to show that the concept of using adhesive delivery systems to pump the adhesive into the joint has previously been addressed. While not explicitly showing a similar type of coupling device, nor the use of a similar adhesive (alkyl borane adhesive), the patent does illustrate the use of an extruded adhesive.

U.S. Pat. No. 4,688,829 is included only to illustrate in a very general way a means of aligning the inserting pipe concentrically into the socket joint. In FIG. 3 of U.S. Pat. No. 4,688,829, there is a first annular ring 12 and a second annular ring 13, which align 7 the inserting pipe into 4, the socket joint.

In U.S. Pat. No. 6,436,224, Nishimura describes a silicon compound used in a solvent, typically toluene, to augment electro fusion (EF, which is another name for heat fusion). The silicon compound acts somewhat like a flux and a sealant. It is especially useful if the pipe has becomes oxidized or surfaces are contaminated with sand or some other loose material which prevents successful electro fusion.

Dow chemical has a pair of published patent applications (US Publication 2003/0047268A1 and 2003/0044553A1) on file that utilize alkyl borane adhesives. The applications discuss the adhesive composition, as they relate to methods to repair fuel tanks.

In Canadian Patent 1,028,376 to Silver et al., Silver teaches a pipe joint having a male joint member and a female joint member, where the end of the male member is tapered and the receiving female member necks down. The two are joined with what approximates a press fit at the male end. The mouth has a ferrule shaped flanged annular cap.

What is needed is a pipe joint suitable for joining pipe joints that hereto before have not been successfully joined using conventional pipe non-metallic pipe cements.

Further, what is needed is a pipe joint that can employ very high solids adhesives, as solvent based adhesive systems produce air emissions, which are progressively being regulated out of existence.

SUMMARY OF THE INVENTION

The invention, in the broadest sense, is a pipe joint that is particularly suitable for joining non-metallic pipes. Examples of non-metallic materials used in the fabrication of pipes are PVC, chlorinated PE, vinyl acetate, PVDC, CPVC, silicone, ABS, acrylic polymers, fluorinated polymers such as PVDF (polyvinylidene difluoride), EPDN, and olefinic pipe materials. Olefinic pipes are commonly formed from HDPE, PEX (e.g., cross-linked polyethylene, a.k.a., ionomers), polypropylene and PTFE (e.g., polytetrafluoroethylene). As discussed in the Background, joining non-metallic pipes with an adhesive is especially difficult for olefinic pipes, as these pipes are comprised of low surface energy polymers that are substantially impervious to solvents.

The invention is a pipe joint that is suitable for use with adhesives that can be dispensed with little or no solvent. The invented joint does not require an adhesive to etch the surface of the pipes, nor an adhesive that effects fusion of the materials by solvation nor by thermal melting. The joint is suitable for high or 100% solids formulations, where the adhesive has one or more parts. For instance, a hot melt adhesive is a 100% solids formulation that is one part adhesive, cyanoacrylates are one-part acrylate adhesives that cure on contact with mated surfaces through a reaction with surface moisture, and epoxy adhesive, urethane or alkyl borane adhesives are typically two-parts adhesives dispensed at 100% solids. In general, the invention is a pipe joint having a male joint member and a female joint member, where the members are joined either as a pipe insertion section and a pipe socket, or as coupled pipe sockets, where each socket is joined with a pipe insertion section, or any other combination of pipe end and a pipe socket that effects a joint of this genre. The joint can be linear or angular.

The pipe joint is comprised of: an extrudable adhesive; a first pipe having a socket with an inside diameter, where the socket has a mouth, a self-centering bottom, and a substantially cylindrical wall with an inlet, an outlet, and an inner annular channel; a second pipe with an insertion section having an end and an outer annular channel, where said second pipe has an outside diameter that is less than the inside diameter of the socket, where the difference in diameters defines a gap, and where the outer annular channel aligns with the inner annular channel therein forming an interlocking keyway; a flanged annular ring, where said annular ring has an inside diameter that enables it to be slid over the second pipe and a thickness that is comparable to the gap, and where the flange has a width that is sufficient to cap the mouth of the socket; and where, when the joint is fully formed, the adhesive has changed to a solid material that substantially fills the gap and the interlocking keyway, and serves as a mechanical key in the interlocking keyway.

With aligned annular channels filled with adhesive, the adhesive forms an in situ key, therein producing an adhesive joint that is a combination of a mechanical and an adhesive joint. The mechanistic combination reduces the shear stress between the adhesive and the pipe, and assures that even under conditions where there is shear failure, that the pipes will still remain joined, and the joint will continue to function. The annular channels also create an avenue for the extruded adhesive to distribute evenly around the circumference of the pipe end, and then flow toward longitudinally filling the gap. The channels serve to express entrained air and act as a reservoir, which can supply the adhesive over a much longer route than would be available if channeled through the inlet port directly into the gap.

BRIEF DESCRIPTION OF THE DRAWINGS

The foregoing and other objects will become more readily apparent by referring to the following detailed description and the appended drawings in which:

FIG. 3 is a side view of the first pipe having a socket.

FIG. 4 is a side view of the second pipe with an insertion section having an end. The insertion section is fitted with a flanged annular ring.

FIG. 5 is a top view of the flanged annular ring.

DETAILED DESCRIPTION OF THE INVENTION

Figure 1:
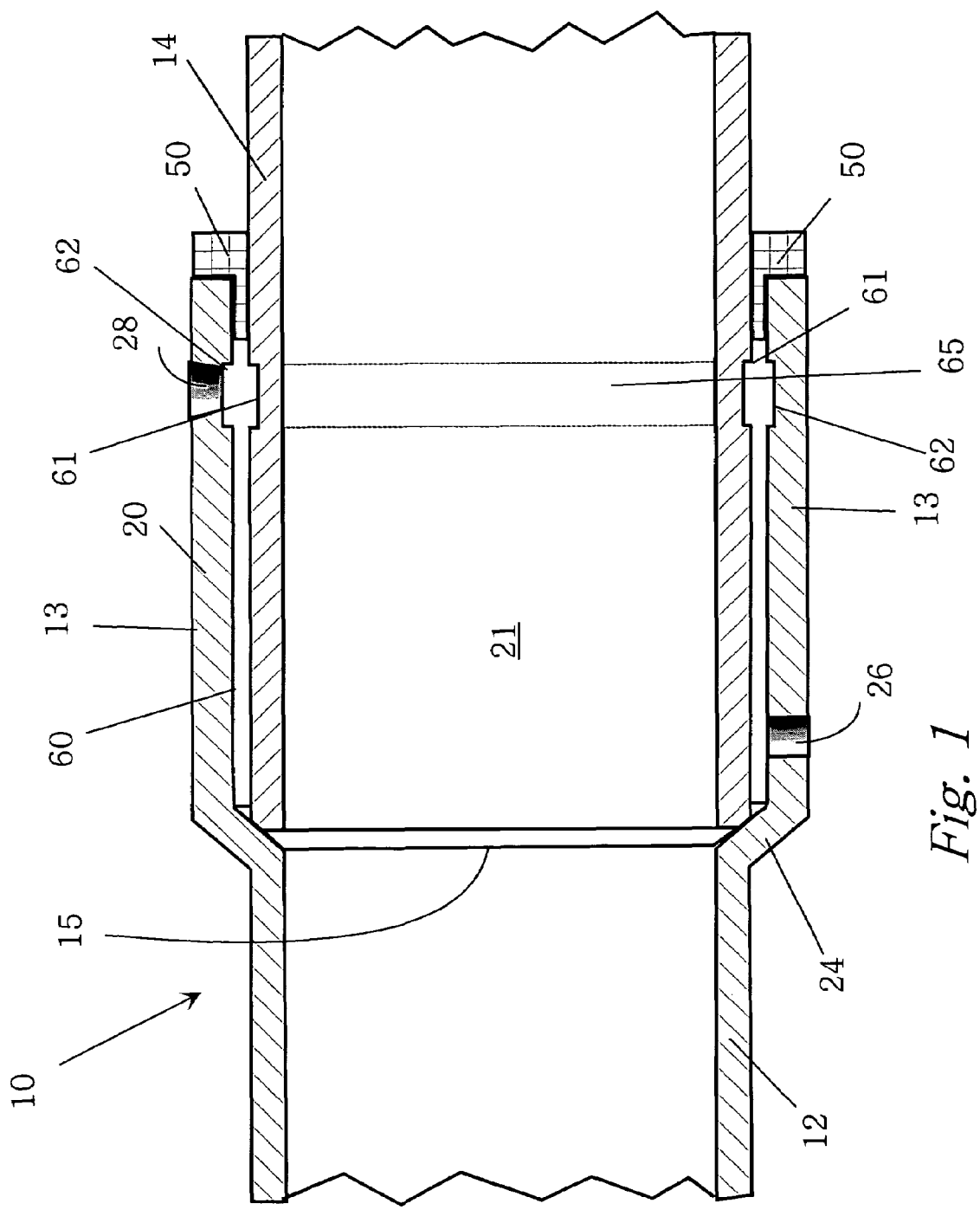
FIG. 1 is longitudinal cross-sectional view of the invented pipe joint.

The invention, as illustrated in the drawings is a pipe joint 10. Referring to FIG. 1, the joint 10 has a first pipe 12 having a socket 20 with an inside diameter, where the socket 20 has a mouth 19 (as shown in FIG. 5), a self-centering bottom 25, and a substantially cylindrical wall 13 with an inlet 28, an outlet 26, and an inner annular channel 62 (also shown in ghost in FIG. 3); a second pipe 14 with an insertion section 21 having a squared-off end 15 and an outer annular channel 61, where said second pipe has an outside diameter that is less than the inside diameter of the socket 20, where the difference in diameters defines a gap 60 and where the outer annular channel 61 aligns with the inner annular channel 62 therein forming an interlocking keyway 65. The inner annular channel 62 and the outer annular channel 61 are substantially deformations in the wall of the socket or the insertion section, respectfully, where a portion of the wall is cutaway or molded into the piece. A flanged annular ring 50 centers the insertion section 21 of the pipe 14. As can be seen in FIG. 4 and FIG. 5, the flanged annular ring 50 has an inside diameter that enables it to be slid over the second pipe 14 and a thickness 54 that is comparable to the gap 60. The flange 52 of the flanged annular ring 50 has a width that is sufficient to cap the mouth 19 of the socket 20.

Figure 2:
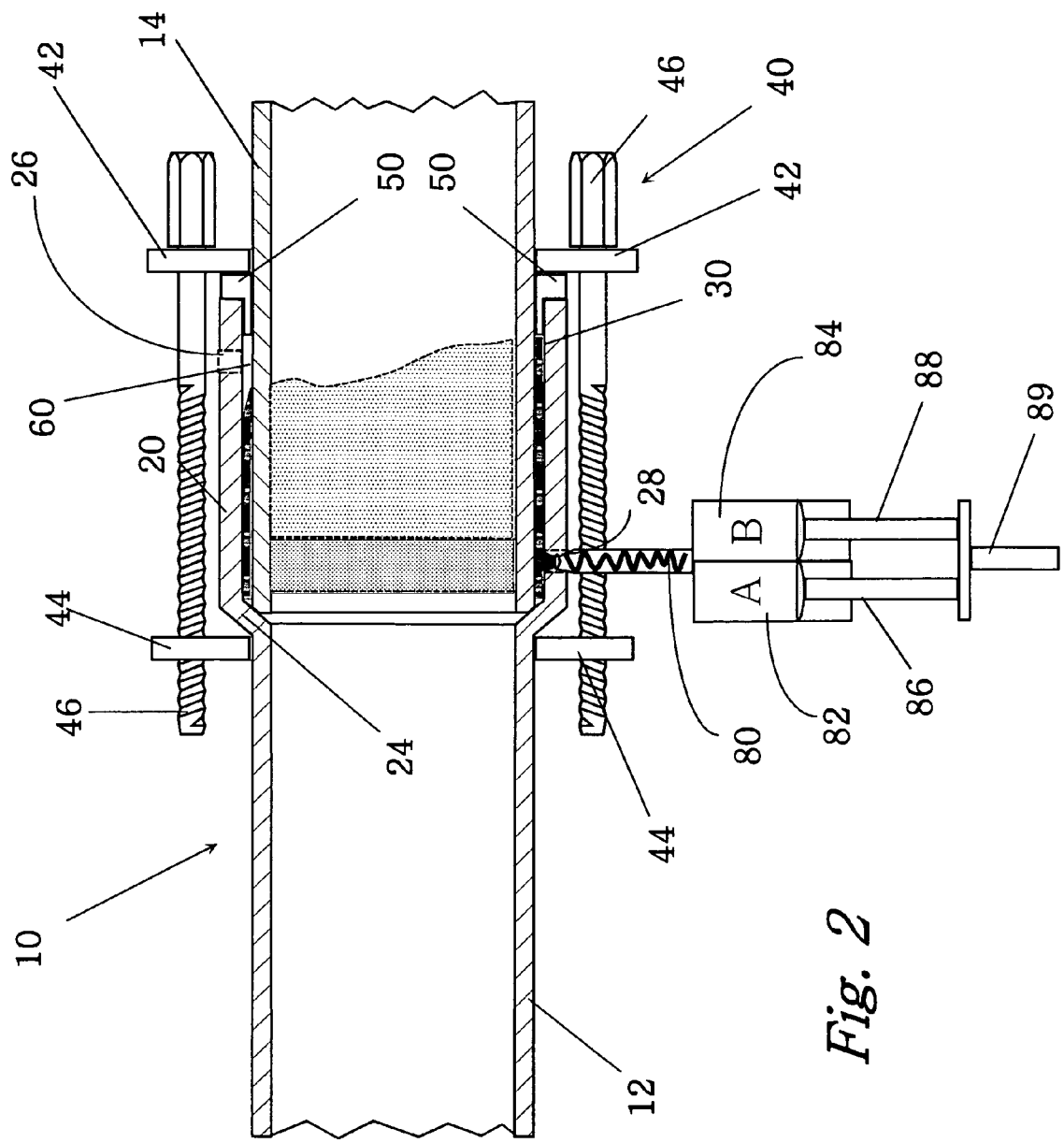
FIG. 2 is longitudinal cross-sectional view of the pipe joint as it is being filled with an extrudable adhesive. The joint is secured with a clamp.

Referring to FIG. 2, the adhesive 30 is extrudable, and as shown in the figure the adhesive is inserted into the inlet 28 and exits the outlet 26. In the illustrated embodiment, the inlet and outlet are arbitrarily selected, and the inlet and outlet are reversed from the other figures. The adhesive 30 flows fastest through the channels forming the interlocking keyway 65, and then is distributed longitudinally toward the outlet. In FIG. 2, the adhesive is a two-part adhesive, A and B, which are mixed as they are extruded in mixing tube 80. The A part is stored in barrel 82, and the B part in barrel 84. Plungers 86 and 88 are actuated by the mechanical pump having piston 89.

Figure 6:
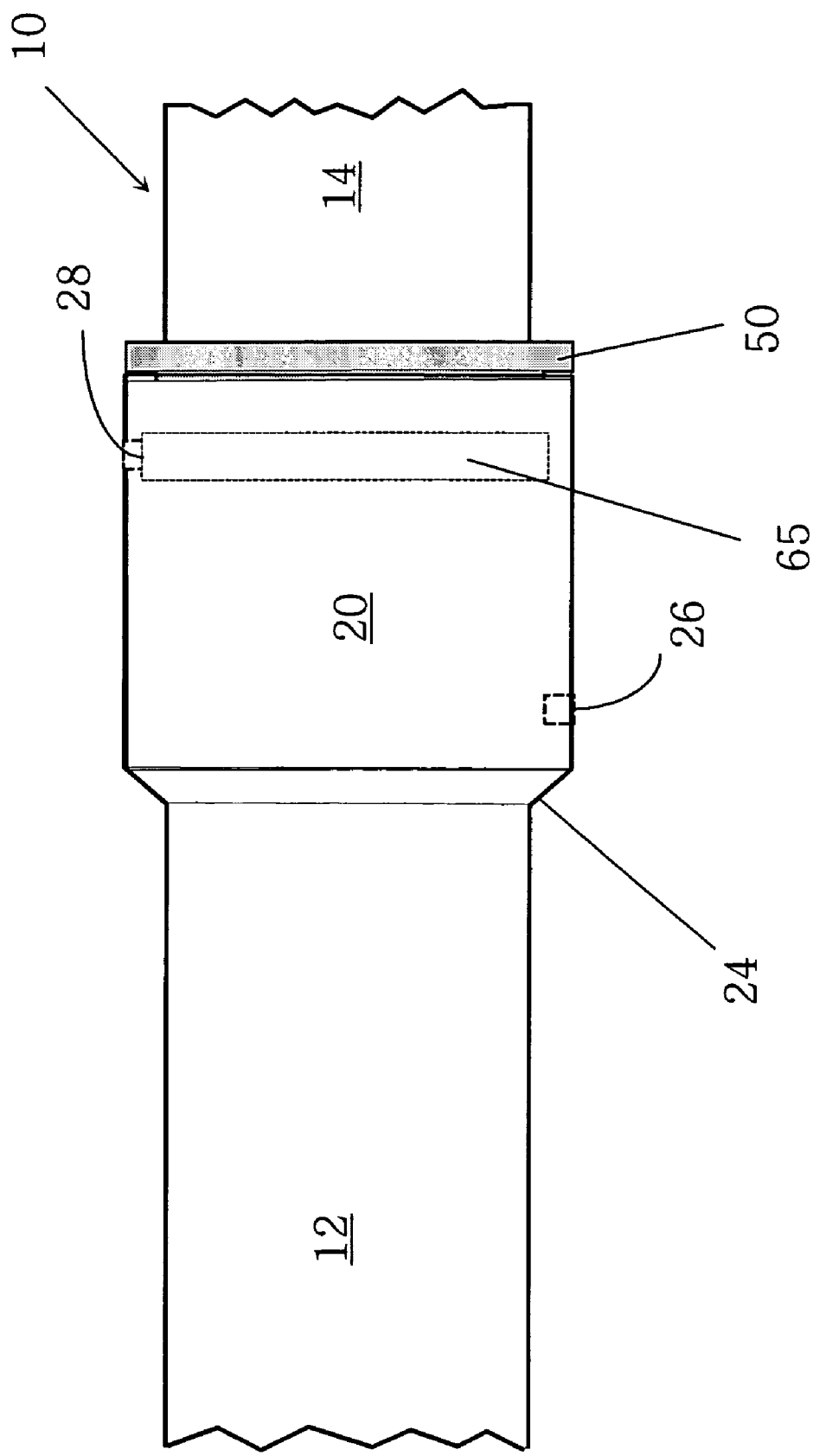
FIG. 6 is perspective side view of the invented pipe joint, wherein an interlocking keyway is shown in ghost.

FIG. 6 illustrates the invented pipe joint, wherein the interlocking keyway 65 is shown in ghost. In FIG. 6 the interlocking keyway 65 closer to the mouth of the socket 20. The adhesive is retained by the flanged annular ring 50.

Figure 7:
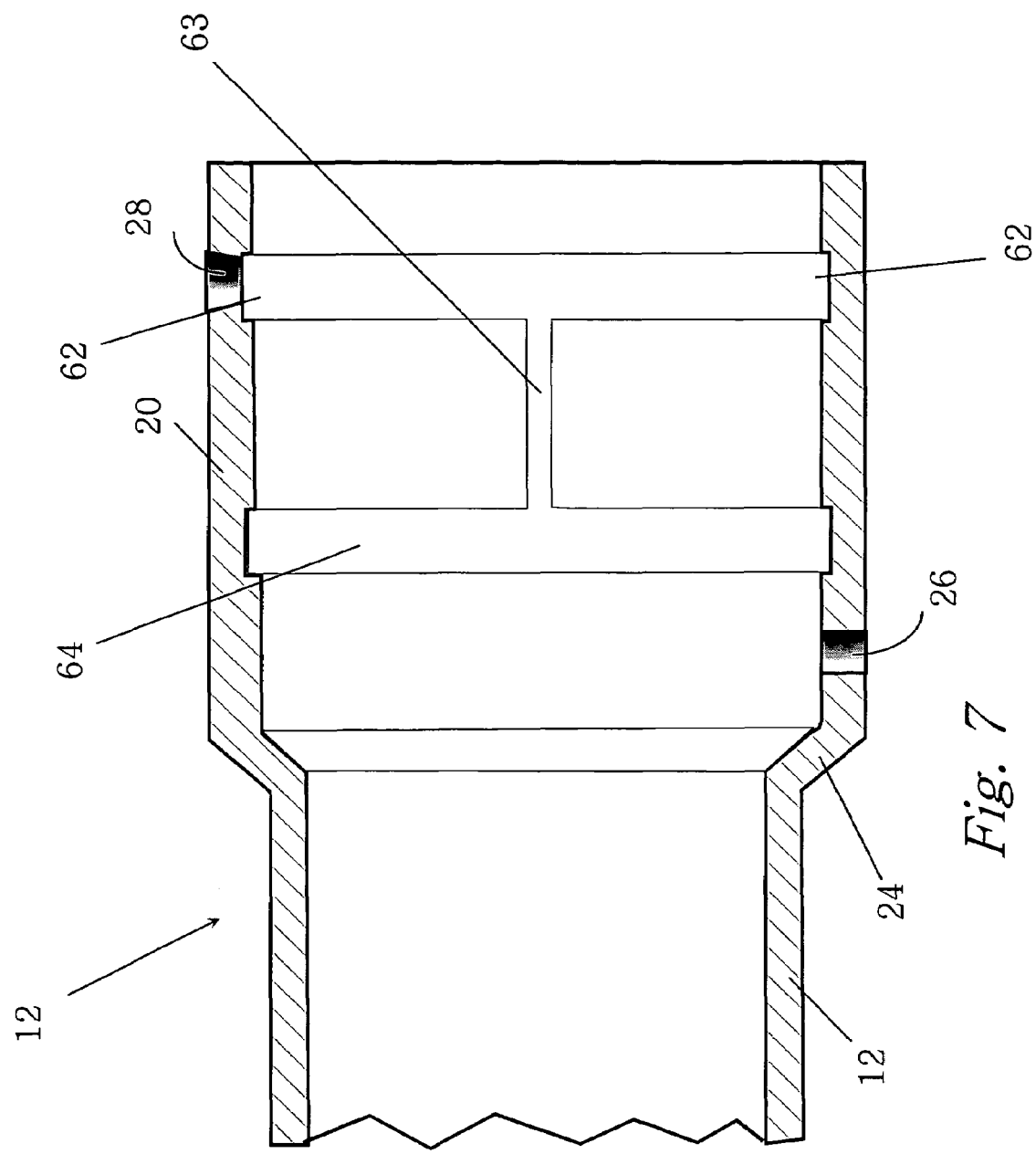
FIG. 7 is longitudinal cross-sectional side view of the first pipe and socket, where the socket has two annular channels.

FIG. 7 is longitudinal cross-sectional side view of a socket that has multiple inner annular channels. There is the channel 65 positioned adjacent to the inlet 28, a second channel 64 closer to the bottom 24, and a longitudinal channel 63. The second annular channel helps to redistribute the adhesive evenly throughout the gap, and if there is a corresponding outer annular channel on the insert section of the second pipe, then a second interlocking keyway is formed.

Figure 8:
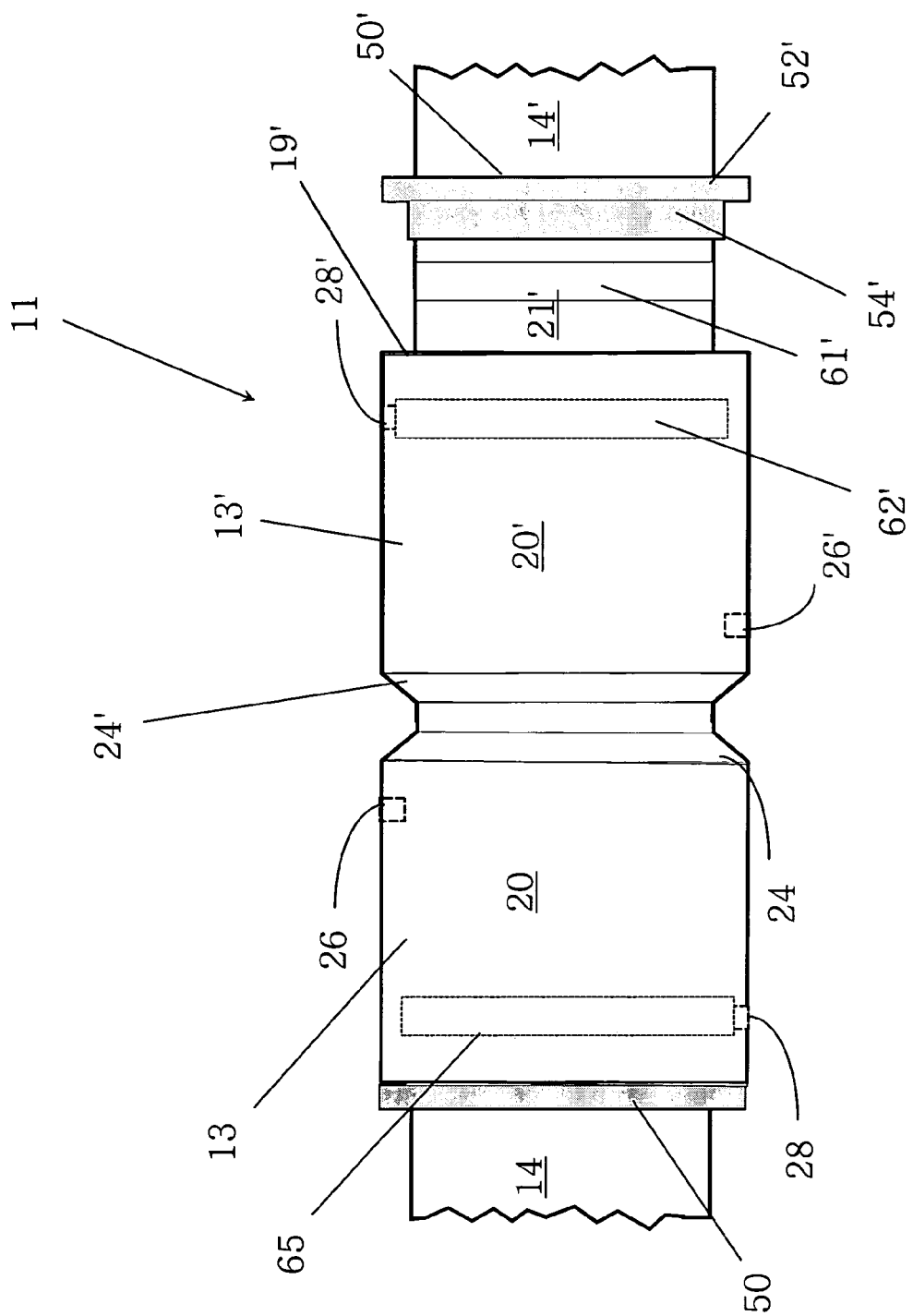
FIG. 8 is a side view a coupling joint, where two socket are coupled, and each socket is joined to a pipe.

FIG. 8 is a side view of a coupling joint 11, where two sockets are coupled, and each socket is joined to a pipe. The coupling joint 11 is comprised of an extrudable adhesive (not shown); a first socket 20 having an inside diameter, where said first socket has a mouth (not labeled), a self-centering bottom 24, and a substantially cylindrical wall 13 with an inlet 28, an outlet 26, and an inner annular channel (not shown). There is also a second socket 20' having an inside diameter, where said second socket has a second mouth 19', a second self-centering bottom 24', and a second substantially cylindrical wall 13' with a second inlet 28', a second outlet 26', and a second inner annular channel 62'. The first and second sockets (20 and 20') are coupled at an angle from 45 to 180 degrees. Additionally, there is a pipe 14 having an insertion section (not visible) with a squared-off end and an outer annular channel. The pipe has an outside diameter that is less than the inside diameter of the first socket, where the difference in diameters defines a first gap and where the outer annular channel lines up with the inner annular channel thereby forming a first interlocking keyway (65 shown in ghost). There is also a second pipe 14' having an insertion section 21' with a squared-off end and a second outer annular channel 61', where said second pipe 14' has a second outside diameter that is less than the inside diameter of the second socket 20", where the difference in diameters defines a second gap (not visible) and where the second outer annular channel 61' lines up with the second inner annular channel 62' (shown in ghost), therein forming a second interlocking keyway (not shown). The first flanged annular ring 50, where said annular ring has a first inside diameter that enables it to be slid over the pipe and a thickness that is comparable to the first gap, and where the first flange has a width that is sufficient to cap the mouth of the first socket. There is a second flanged annular ring 50', where said second annular ring has a second inside diameter that enables it to be slid over the second pipe and a thickness 54' that is comparable to the second gap, and where the second flange has a width 52' that is sufficient to cap the mouth of the second socket 20'. When the coupling joint 11 is fully formed, the adhesive has changed to a solid material that substantially fills the gap and the first interlocking keyway 65, and serves as a first mechanical key in the first interlocking keyway. When other end of the coupling joint 11 is fully formed, the adhesive has changed to a solid material that substantially fills the gap and the second interlocking keyway, and serves as a second mechanical key in the second interlocking keyway.

The invention is furthermore a system for joining olefinic pipes. The system comprises an extrudable alkyl borane adhesive having a solids content that is greater than or equal to 90% solids by weight; a means for delivering the adhesive; a first pipe having a socket with an inside diameter, where said socket has a mouth, a self-centering bottom, and a substantially cylindrical wall with an inlet, an outlet, and an inner annular channel; a second pipe having an insertion section with an end and an outer annular channel, said second pipe having an outside diameter that is less than the inside diameter of the socket, where the difference in diameters defines a gap and where the outer annular channel lines up with the inner annular channel therein forming an interlocking keyway. Additionally, there is a flanged annular ring, where the annular ring has an inside diameter that enables it to be slid over the second pipe and a thickness that is comparable to the gap, and where the flange has a width that is sufficient to cap the mouth of the socket; wherein said flanged annular ring can slide onto the second pipe with the flange away from the end; wherein the second pipe can be inserted into the socket so the end rests on the bottom of the second pipe; wherein the bottom self-centers the end of the insertion section, and the flanged annular ring, slipped down such that the flange is flush with the mouth of the socket, centers the insertion section in the socket and caps the gap. The means of delivering the adhesive is positioned at the inlet, and the adhesive is injected into the gap, filling the gap, and overflowing out the outlet.

The adhesive is selected so that it cures at room temperature in an acceptable time frame. The adhesive is typically a two-part adhesive that is mixed inline, as with a static mixer, as it is injected into the pipe joint. After curing the clamp is removed.

The invented system is suitable for joining olefinic pipes using alkyl borane low surface energy adhesives. The disclosed unique pipe joint precisely defines the thickness (not viscosity) of the adhesive. Other aspects of the invented system include a means for delivering the adhesive, and a clamp that is used in conjunction with the unique pipe joint.

Applicant has observed that there is a correlation of adhesive failure to the thickness of the adhesive. Without control over the adhesive thickness, the mode of failure is by cohesive failure, as measured by lap shear tests. When the adhesive layer becomes too thick there is a lower threshold of performance in adhering pipe joints. By employing a pipe joint that has created an in situ mechanical key, the joint is much less sensitive to small changes in the adhesive thickness that can arise naturally from the pipes being out-of-round.

Furthermore, Applicant has determined that if the adhesive thickness is controlled with a given range, then an acceptable adhesive bond can be attained that is suitable for high end performance applications, however as the pipe diameter becomes larger, it is more difficult to maintain these tolerances, and the disclosed invention overcomes these limitations.

Alkyl borane adhesives have been found to be suitable for joining olefinic pipe, pipe joints that are suitable for adhering using a chemical means, and joint systems that employ alkyl borane adhesives and specialized joints. Many of these adhesive compositions are pyrophoric in the presence of oxygen.

The preferred alkyl borane adhesives are a blend of acrylics used in conjunction with an alkyl borane. Reportedly, there are a number of adhesive systems that are suitable for bonding low energy surfaces. Among the more prominent systems are the alkyl boranes, also known as boron alkyls, also known as organo boranes. In these adhesive systems, the alkyl borane acts as a catalyst for the polymerization of oligomers, diluent monomers and cross-linking promoters additives, as well as co-accelerators like amines which speed up the polymerization. In general, alkyl boranes are widely reported in the literature as catalyst for the polymerization of alkenes (i.e. ethylene, propylene, 1-hexene, and to a lesser extent isoprotrenes, styrenes and vinyl acetates, and butadiene). These systems generally require substantial heat and often are gas phase reactions. The adhesives of interest for the invention are lower temperature curing systems, and preferably would cure around room temperature, and would have a Tg that is low enough that the adhesive does not embrittle.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A pipe joint, said joint comprising:
   an extrudable adhesive that solidifies on being extruded;
   a first pipe having a socket with an inside diameter, where said socket has a mouth that is an open end of the socket, a self-centering bottom that is an opposing seating end of the socket, and a substantially cylindrical wall with an inlet, an outlet, and, an inner annular channel;
   a second pipe having an insertion section with an end and an outer annular channel, where said insertion section of the second pipe is inserted into the socket of the first pipe, said second pipe having an outside diameter that is less than the inside diameter of the socket, where the difference in diameters defines a gap and where the outer annular channel of the second pipe lines up with the inner annular channel of the second pipe, the aligned channels defining an interlocking keyway filled with the extrudable adhesive;
   a flanged annular ring, where said annular ring has an inside diameter that enables it to slide over the second pipe and a thickness that is comparable to the gap, and where the annular ring has a flange with a width that is sufficient to cap the mouth of the socket;
   a temporary clamp that secures the insertion end, the socket and the flanged annular ring as the adhesive is extruded into the joint and until the adhesive has solidified; and
   wherein, when said pipe joint is fully formed when the extrudable adhesive, after being injected into the joint substantially filling the gap and the interlocking keyway, solidifies, therein forming a mechanical key in the interlocking keyway.

2. The pipe joint, as claimed in claim 1, wherein said inlet is in fluid communication with the interlocking keyway.

3. The pipe joint, as claimed in claim 2, wherein said interlocking keyway serves to circumferentially distribute the extrudable adhesive around the joint.

4. The pipe joint, as claimed in claim 2, wherein said outlet is in fluid communication with the gap at a point distal to the inlet.

5. The pipe joint, as claimed in claim 1, wherein said interlocking keyway provides path for the extrudable adhesive to distribute circumferentially and flow longitudinally filling the gap and expelling entrained air.

6. The pipe joint, as claimed in claim 1, wherein said joint has one or more additional interlocking keyways, where two or more outer channels are, aligned with two or more inner channels.

7. The pipe joint, as claimed in claim 1, wherein said outer annular channel of the second pipe is cut into the insertion section using a router tool just prior to forming the joint.

8. The pipe joint, as claimed in claim 1, wherein said pipe joint is comprised of an olefinic pipe material hiving a low surface energy and excellent resistance to solvents.

9. The pipe joint, as claimed in claim 8, wherein the olefinic pipe material is selected from the group consisting of: HDPE, PEX, polypropylene and PTFE.

10. The pipe joint, as claimed in claim 1, wherein the extrudable adhesive is. selected from the group consisting of: hot melt adhesives, cyanoacrylates adhesives, epoxy adhesives, urethane adhesives, alkyl borane adhesives, free radical and high solids adhesives.

11. The pipe joint, as claimed in claim 10, wherein the extrudable adhesive is an alkyl borane two part adhesive.

12. The pipe joint, as claimed in claim 11, wherein said alkyl borane adhesive is comprised of an organo borane in conjunction with acrylic oligomers, diluents, and monomers suitable for joining olefinic pipe.

13. The pipe joint, as claimed in claim 1, wherein the adhesive is extruded using a mechanically actuated pump that can pump and mix one or more parts.

14. A coupling joint, said joint comprising:
   an extrudable adhesive that solidifies on being extruded;
   a first socket having an inside diameter, where said first socket has a first mouth that is an open end of the first socket, a self-centering bottom that is an opposing seating end of the first socket, and a substantially cylindrical wall with an inlet, an outlet, and an inner annular channel;
   a second socket having an inside diameter, where said second socket has a second mouth that is an open end of the second socket, a second self-centering bottom that is an opposing seating end of the second socket, and a second substantially cylindrical wall with a second inlet, a second outlet, and a second inner annular channel;
   wherein said first and second sockets are coupled end-to-end at an angle from 45 to 180 degrees;
   a first pipe having a first insertion section with a first end and a first outer annular channel, where said first insertion section of the first pipe is inserted into the open end of the first socket, said pipe having an outside diameter that is less than the inside diameter of the first socket, where the difference in diameters defines a first gap and where the outer annular channel lines up with the inner annular channel therein forming a first interlocking keyway filled with the extrudable adhesive;
   a second pipe having a second insertion section with a second end and a second outer annular channel, where said second insertion section of the second pipe is inserted into the second socket, said second pipe having a second outside diameter that is less than the inside diameter of the second socket, where the difference in diameters defines a second gap and where the second outer annular channel lines up with the second inner annular channel therein forming a second interlocking keyway filled with the extrudable adhesive;
   a first flanged annular ring, where said first annular ring has a first inside diameter that enables it to slide over the first pipe and a first thickness that is comparable to the first gap, and where the first annular ring has a first flange has a first width that is sufficient to cap the first mouth of the first socket;

a second flanged annular ring, where said second annular ring has a second inside diameter that enables it to slide over the second pipe and a second thickness that is comparable to the second gap, and where the second annular ring has a second flange has a second width that is sufficient to cap the second mouth of the second socket;

a temporary clamp that secures the coupling joint while the extrudable adhesive is being extruded into the coupling joint and until the adhesive has solidified; and wherein, said coupling joint is fully formed after the adhesive solidifies, therein forming, a first and second mechanical key in the first and second interlocking keyways.

15. The coupling joint, as claimed in claim 14, wherein said first outlet is in fluid communication with the gap at a point distal to the first inlet, and said second outlet is in fluid communication with the gap at a point distal to the second inlet.

16. The pipe joint, as claimed in claim 14, wherein said extrudable adhesive flows longitudinally from the interlocking keyway filling the gaps and expelling entrained air.

* * * * *